United States Patent Office 3,140,873
Patented July 14, 1964

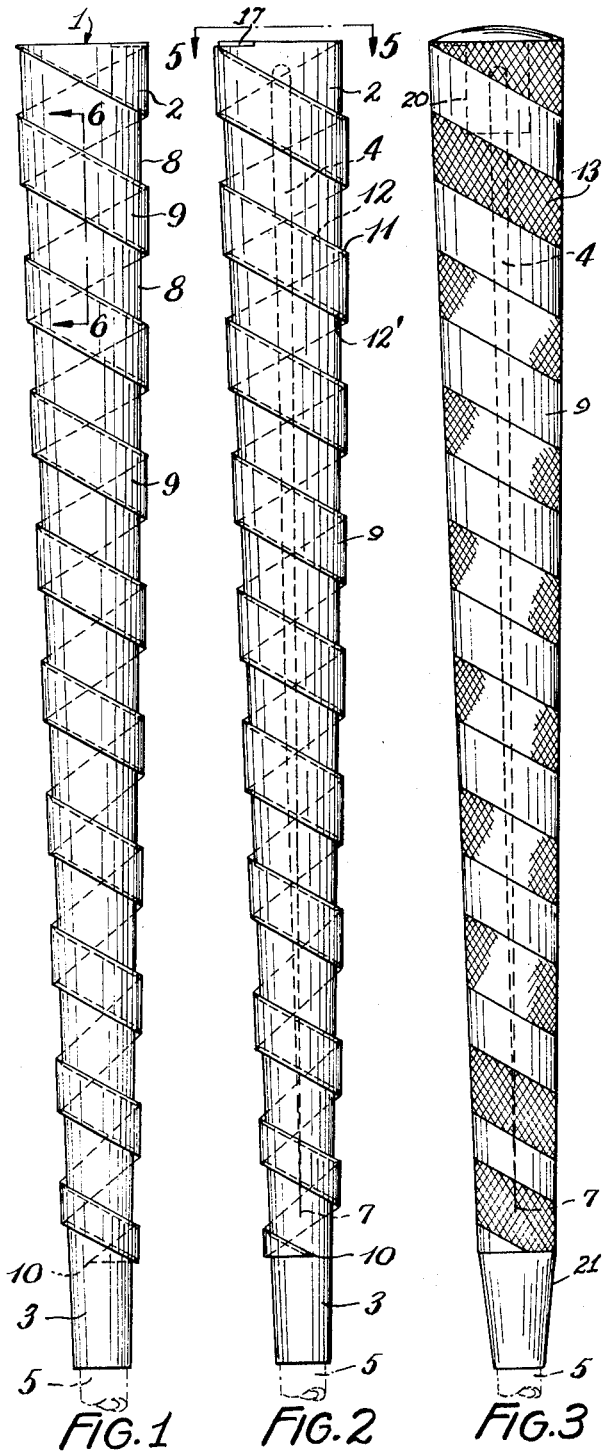

3,140,873
GROOVED GOLF CLUB HANDLE SLEEVE AND STRETCHABLE INSERT TO FILL SAID GROOVE
Hoyle T. Goodwin, Durham, N.C., assignor to Goodwin Manufacturing & Development Company, Inc., Durham, N.C., a corporation of North Carolina
Filed Nov. 15, 1960, Ser. No. 69,313
4 Claims. (Cl. 273—81.5)

This invention relates to game apparatus and more particularly pertains to a grip for golf clubs and the like wherein the grip comprises a composite construction including a molded spirally grooved sleeve constituting an underlisting with a stretchable wrap-in strip applied in the groove throughout substantially the length of the grip.

One of the objects of this invention is an effective composite grip which is particularly adapted to production line techniques in its manufacture and can thus be produced at comparatively low costs.

Another object of this invention is a molded underlisting comprising a sleeve having a continuous spirally arranged groove or recess formed in its outer surface for receiving a wrap-in strip and in which the sleeve is preferably formed by injection molding, thereby eliminating flashings such as would be present in a sleeve in a multi-part mold, together with the attendant additional processing in removing such flashings.

Another object of this invention is to produce a slip-proof composite grip so constructed as to resist torsional stresses and strains in using the grip.

Another object of this invention is a composite grip including a molded underlisting sleeve having a continuous spiral groove or recess extending throughout substantially the length of the sleeve and forming between the convolutions of the groove a continuous spiral or raised portion or gripping surface and in which the groove is adapted to receive a stretched elastic strip, the longitudinal side walls or edges of the strip and the respective longitudinal side walls of the lands being formed for interlocking engagement when a stretching effort imposed upon the strip reposing in said groove during assembly is subsequently partially released.

Another object is a composite grip comprising a molded underlisting and wrap-in strip secured together without the use of adhesives.

A further object of the invention is to provide a wrap-in strip which is slightly wider than a spiral groove formed in the underlisting strip to which the sleeve is to be applied but which when stretched longitudinally and seated in said groove under stretch will be locked therein without the aid of adhesives when the stretching effort or pull is released.

A further object of the invention is a simple and novel means of anchoring the elastic strip or wrap-in at the top of the grip.

Other objects and advantages of this invention will become more apparent as the following description of an embodiment thereof progresses, reference being made to the accompanying drawing in which like reference characters are employed to designate like parts throughout the same.

In the drawings:

FIGURE 1 is a side elevational view of an injection molded underlisting or sleeve having a spiral groove therein, the convolutions of which are separated by a spiral land portion integral with the sleeve;

FIGURE 2 is a view similar to FIGURE 1 but is rotated approximately 180°;

FIGURE 3 is an elevation of the grip showing the wrap-in strip assembled on the underlisting;

FIGURE 4 is a plan view of a wrap-in strip forming a part of this invention;

FIGURE 5 is a top plan view of the grip taken in the direction of the line 5—5 of FIGURE 2 and before assembly on a club shaft;

FIGURE 6 is a sectional view of the underlisting showing the groove for receiving the wrap-in strip and is taken on line 6—6 of FIGURE 1;

FIGURE 7 shows a conventional plug-in cap for insertion in one end of the molded sleeve and which serves as a means for preventing dislodgment of the upper end of the wrap-in strip; and FIGURE 8 is a section through a reinforced wrap-in strip.

In carrying out my invention, as illustrated in the embodiment shown in the drawing, I provide a molded sleeve or tubular underlisting which is telescoped over the upper end of a golf club shaft and which is preferably produced in an ejection type mold and which further is provided with a helical groove formed along its outer surface for receiving and retaining therein a wrap-in strip as a component part of the grip without the use of adhesives or the like.

More specifically, in referring to the drawing, a molded tubular underlisting 1 formed of an elastic material such as rubber or the like and having a cross section tapering from its top end 2 to its bottom end 3 may be provided with a longitudinally disposed guide rib 4 integral with the inner wall of the underlisting. When the underlisting is telescoped into its assembled position on the upper end of a metal club shaft 5, the guide rib will cause the underlisting to bulge outwardly throughout the length of the rib, as at 6, FIGURE 5, and to thereby indicate the proper position for placing the hands in gripping the club. The guide rib is also preferably tapered to a point at its lower extremity, as at 7.

As illustrated in FIGURES 1 and 2, the tubular underlisting is formed of a helical groove 8 extending from its top end to a point short of but close to its lower end. Alternating between the convolutions of the groove, there is formed a helical raised portion or rib 9, the outer surface of which is outwardly disposed relative to the bottom wall of the groove 8 and terminates in a pointed bottom end 10.

The side walls 11 of the helical rib 9 defining the depth of the helical groove 8 are inclined toward each other, as at 12 and 12', FIGURES 1, 2 and 6, to provide a keyway for interlocking engagement with the side edges of a wrap-in strip 13 to retain the strip when it is assembled in the groove.

The wrap-in strip 13 comprises an elongate strip of reinforced elastic material having a normal width slightly greater than that of the groove 8 and terminates at each end in an inclined edge portion, as at 14, so that these inclined edges will lie laterally of the grip both at the top and bottom extremities thereof. The strip 13 preferably consists of a strip of elastic material, such as rubber, to which is bonded a layer of bias cut fabric on its underside so as to permit a predetermined amount of stretch of the strip to reduce its width sufficiently to permit the strip to be laid in the groove 8 during assembly on the underlisting while at the same time materially increasing the tensile strength of the strip. The composite strip of rubber bias cut fabric may be cut from sheets formed by molding or bonding the rubber and bias cut fabric together and then die cutting the sheets into strips of selected widths and lengths.

The upper end of the wrap-in strip is provided with a metallic tip 15 by which the strip is anchored in a slot 16 in the upper end of the underlisting. A portion of the top surface of the tubular underlisting is relieved, as at 17, from the slot 16 to the outer surface of the tube so as to receive the tipped end of the strip lying flat on the relieved portion 17 with the tip inserted in the slot 16. In such position, the stem 18 of the end cap or plug 19 may be inserted in the bore 20 at the top of the underlisting so that the head of the plug 19 will engage the anchored end of the strip to hold it in anchored position.

With the top end of the strip so anchored, the strip is placed under tension by pulling the same longitudinally in the direction in which the strip is to be wrapped on the underlisting and while under such tension is threaded into and along the helical groove 8 of the underlisting. Such tension on the strip will, of course, lessen its width as it is threaded and seated in the helical groove and thereby increases the ease with which it can be assembled in the groove.

Since the opposite side walls of the helical rib 9 are inclined inwardly toward each other, the side wall of each adjacent convolution of the rib will lie in an opposed inclined direction as at 12 and 12″ (FIGURE 6) forming with the groove 8 a helical keyway within which the strip is seated and locked in place as some of the tension on the strip is released as it is threaded into and downwardly along the groove by turning the club shaft.

The lower end of the strip, indicated at 21, extending beyond the lower end of the rib pointed end 10 is wrapped around the tapered bottom end portion 3 of the underlisting so that the wrap-in can be terminated in a smooth ending below the rib and can be secured in such position by any suitable means such as wrapping a thread around the same along the extended portion 3 of the underlisting.

The wrap-in strip may have its outer surface knurled or serrated to enhance the gripping qualities and to afford greater gripping contact with the hands of the player. It will be understood that the construction of this grip lends itself to many combinations of color arrangements since not only the underlisting but also the wrap-in strip may be made of materials of different colors and may also be formed with gripping surfaces of various designs, all contributing to a pleasing appearance and providing means for identification. It will be noted that the internal rib 4 is tapered downwardly to a vanishing point 7 from the top of the rib which further permits the convolutions of the wrap-in strip at the lower end of the grip to be blended together in a smooth terminal portion.

FIGURE 8 of the drawing illustrates in section a fragment of the wrap-in strip which comprises an outer layer of thin rubber 22 and an under layer of bias cut fabric 23, both of these layers being preferably intimately bonded together throughout their contacting surfaces.

From the above, it will thus be seen that my invention provides a golf club grip of simple construction and comprises primarily a molded underlisting which may be formed in an ejection type mold, thus being free of flashings which would occur along the parting line of multiple piece molds and which otherwise would have to be removed before the wrap-in strip could be applied to the underlisting. Thus, an underlisting such as is contemplated by this invention can be produced at low cost because it eliminates subsequent finishing operations by coming from the mold in a finished condition ready to receive the wrap-in strip.

Another important feature of this invention resides in an underlisting having a helically arranged rib extending from the top and to a point near its bottom and wherein the convolutions of the rib are spaced apart to provide grooves for accommodating a wrap-in strip, the side walls of the helical rib being inclined in such a way that a wrap-in strip having a width slightly greater than the width of the helical groove when not under tension can be seated in the groove by applying a tension on the strip as it is threaded into the groove and can be retained therein by the oppositely inclined side walls of the rib when tension on the strip is lessened to allow the strip to return toward its normal width.

Furthermore, I have provided anchoring means for the upper end of the strip in the top of the underlisting so that the strip may be placed under tension prior to feeding the strip into the helical groove at its upper end.

Various changes may be made in the details of construction and arrangement of parts of the invention without departing from the spirit thereof or the scope of the appended claims.

I claim:

1. A golf club grip structure for assembly axially on an end of a golf club shaft and comprising a molded underlisting having a helical rib formed integral thereon, the convolutions of the rib being spaced apart and forming a helical groove therebetween for receiving a wrap-in strip stretchable under tension, and a wrap-in strip having a normal width slightly greater than that of the helical groove, said strip having a degree of stretchability sufficient so that the strip can be reduced in width to permit it to be laid in the helical groove, the opposed side walls of the helical groove being formed for interlocking engagement with the sides of the strip when tension on the strip is relieved.

2. A golf club grip structure for assembly axially on an end of a golf club shaft and comprising a molded tubular underlisting having a helical groove extending substantially throughout its length, and a longitudinally stretchable wrap-in strip, said strip having a degree of stretchability sufficient so that the strip can be reduced in width to permit it to be laid in the helical groove while under tension, said groove having oppositely inclined side walls for interlocking engagement with the side edges of the inserted strip when tension is released whereby the strip is retained in the groove by interlocking of the adjacent strip and groove side edges respectively.

3. A golf club grip structure for assembly on an end of a golf club shaft and comprising a molded tubular underlisting having a helical groove extending substantially throughout its length, and a stretchable wrap-in strip insertable in the groove under tension, said strip having a degree of stretchability sufficient so that the strip can be reduced in width to permit it to be laid in the helical groove, the respective adjacent side walls of said groove and said strip being formed for interlocking engagement with each other to retain the strip in the groove when tension on the strip is relieved, a headed end cap insertable in the top end of the underlisting, and cooperating interfitting means on the top end of the underlisting and on an end of the wrap-in strip and firmly engageable by the head of the cap to anchor the said end of the strip in the underlisting prior to and subsequent to the application of tension to the strip to thereby anchor said end of the strip to the underlisting.

4. A golf club grip structure for assembly on an end of a golf club shaft and comprising a molded tubular underlisting having a helical groove extending substantially throughout its length, and a stretchable wrap-in strip insertable in the groove while under tension, said strip having a degree of stretchability sufficient so that the strip can be reduced in width to permit it to be laid in the helical groove, the respective adjacent side walls of said groove and said strip being formed for interlocking engagement with each other to retain the strip in the groove when tension on the strip is relieved, a headed end cap insertable in the top end of the underlisting, and cooperating interfitting means on the top end of the underlisting and on an end of the wrap-in strip engageable by the head of the cap to anchor the said end of the strip in the underlisting prior to the application of tension to the strip, the top end surface of the tubular underlisting being provided with a substantially radial slot extending longitudinally thereof and said top end of the underlisting having a portion relieved circumferentially from the slot along its top surface, said wrap-in strip terminating at its upper end in a tip portion insertable in said slot and overlying the relieved portion of the underlisting top surface, whereby to anchor the said end of the strip in the underlisting when the headed cap is inserted and assembled in the upper end of the underlisting to securely engage its head with the said overlying tip end portion of the strip and the unrelieved portion of the said upper end of the underlisting.

References Cited in the file of this patent
UNITED STATES PATENTS

| | | |
|---|---|---|
| 834,711 | Clarke et al. | Oct. 30, 1906 |
| 1,535,667 | Horne | Apr. 28, 1925 |
| 2,000,295 | Oldham | May 7, 1935 |
| 2,437,404 | Robinson | Mar. 9, 1948 |
| 2,671,660 | Goodwin | Mar. 9, 1954 |
| 2,704,668 | Park | Mar. 22, 1955 |
| 2,772,090 | Brandon | Nov. 27, 1956 |
| 2,781,196 | Brandon | Feb. 12, 1957 |